United States Patent [19]
Abbasi et al.

[11] Patent Number: 5,550,898
[45] Date of Patent: Aug. 27, 1996

[54] METALLIC MACROCELL/MICROCELL INTERFACE

[75] Inventors: Salman Y. Abbasi, Clifton; Irwin Gerszberg, Kendall Park; Eugene T. Kendig, Brick Township; Jeffrey S. Martin, Dover; Thomas M. Oplinger, Morristown, all of N.J.

[73] Assignee: Lucent Technologies Inc., Murray Hill, N.J.

[21] Appl. No.: 456,012

[22] Filed: May 31, 1995

Related U.S. Application Data

[63] Continuation of Ser. No. 218,470, Mar. 28, 1994, abandoned, which is a continuation of Ser. No. 983,348, Nov. 30, 1992, abandoned.

[51] Int. Cl.[6] .................................................. H04Q 7/22
[52] U.S. Cl. ........................ 379/59; 455/33.1; 370/95.3
[58] Field of Search .................................. 379/58, 59, 60, 379/61; 455/33.1, 33.2, 56.1, 33.3, 33.4; 370/95.1, 95.3

[56] References Cited

U.S. PATENT DOCUMENTS

| | | | |
|---|---|---|---|
| 4,748,655 | 5/1988 | Thrower et al. | 379/58 |
| 5,067,147 | 11/1991 | Lee | 455/33.3 X |
| 5,084,869 | 1/1992 | Russell | 370/85.7 |

FOREIGN PATENT DOCUMENTS

| | | |
|---|---|---|
| A-0439926A2 | 7/1991 | European Pat. Off. . |
| A-0233963A1 | 2/1987 | Germany . |

OTHER PUBLICATIONS

International Switching Symposium 1992, "Diversification and Integration of Networks and Switching Technologies Towards the 21st Century", Proceedings, vol. 1, Oct. 25, 1992, Yokohama (JP), pp. 273–277, J. Sarnecki et al 'Microcell Design Principles—A Trigger for Subscriber'.

"The Cellular Concept", by V. H. MacDonald, Bell System Technical Journal, vol. 58, 1979, pp. 15–41.

International Switching Symposium 1992, "Diversification and Integration of Networks and Switching Technologies Towards the 21st Centruy" Proceedings vol. 1, 25 Oct. 1–92, Yokohama Japan, pp. 273–277, J. Sarnecki et al, Microcell Design Principles—a Trigger for Subscriber Density.

IEEE, Region 10 Conference on Computer and Comm. Sys., "Flexible System Techniques for Future personal Mobile Comm.", chia, 9–90, pp. 1–5.

Primary Examiner—Curtis Kuntz
Assistant Examiner—G. J. Oehling
Attorney, Agent, or Firm—Alfred G. Steinmetz

[57] ABSTRACT

A microcell unit, in a cellular telephone system using digital signal processing BSs, is digitally connected to a macrocell, via a metallic link, such as a twisted pair. The microcell includes a plurality of radio channel units (RCU), to provide voice connectivity to mobile subscribers (MS), which are under control of a radio control complex (RCC) located in the macrocell. Several time slots of the macrocell TDM bus, through which the RCC exerts control of the RCUs, are remoted to the microcell thereby enabling control of the RCUs at the microcell location by the RCC of the macrocell. This remoting action is achieved, via a remote time division multiplex (TDM) circuit pack which enables the RCC to communicate with the RCUs as if they were located within the macrocell.

5 Claims, 3 Drawing Sheets

5,550,898

METALLIC MACROCELL/MICROCELL INTERFACE

This application is a continuation of application Ser. No. 08/218,470, filed on Mar. 28, 1994, now abandoned, which is a continuation of application Ser. No. 07/983,348, filed on Nov. 30, 1992, now abandoned.

FIELD OF THE INVENTION

This invention relates to mobile radio telecommunications systems and in particular to microcellular access stations to be used in conjunction with macrocellular base stations for use in cellular telecommunication systems.

BACKGROUND OF THE INVENTION

Cellular communication systems are divided into a plurality of contiguous specific geographical coverage areas called cells. Access, via mobile subscriber (MS) radiotelephones, to the telephone network is through a cell site or macrocellular base station (BS) located in each cell, (i.e., equipment which includes antennas, radio transceivers and control equipment operative to facilitate radio air interconnection between a MS and the BS assigned to cover the geographical area where the MS is located). The BS is connected to a mobile switching center (MSC) which is in turn connected to the public switched land telephone network (PSTN). A detailed description of the cellular telecommunications system may be found in "The Cellular Concept" by V. H. MacDonald in The Bell System Technical Journal, January 1979, Vol. 58 No. 1, pages 15–42.

Coverage in the geographical area of a cell by a single BS is typically uneven. Due to topographical features and building structures and highway passageways; dead or weak spots exist within the cell's geographical area. Coverage of an MS within these dead or weak spots is either substandard or non-existent. MSs may fail to connect, may be suddenly disconnected or may experience a fading of transmission signals.

Coverage of a cell area may be readily enhanced by the utilization of microcells distributed among the dead or weak spots or in places needing enhanced capacity to handle MSs. Microcell access stations typically act as satellites or repeaters and are used to illuminate or radiate the dead or weak spots. The typical microcell access station includes amplifiers and radiation antennas. All other signal processing is performed at the BS. They are typically connected to the cell site or BS, via a high capacity link such as light fiber.

BSs operate with analog signal processing at present. The light fiber link is hence used to transmit analog signals between the BS and the microcell. These light fiber lines are frequently provided by a public utility whose tariff is based on a digital bit rate use. Hence transmitting analog signals becomes prohibitively expensive.

SUMMARY OF THE INVENTION

A microcell access station, in a cellular radio telephone system using digital signal processing BSs, is digitally connected to a macrocell BS, via a metallic link, such as a twisted pair T1 carrier link. The microcell access station includes a plurality of radio channel units (RCU), to provide voice connectivity to mobile subscribers (MS). The RCUs are under control of a radio control complex (RCC) located in the macrocell BS. Several time slots of the time division multiplex TDM bus in the macrocell BS, through which the RCC exerts control of the RCUs, are remoted to a multiplex bus segment of the microcell access station thereby enabling control of the RCUs located at the microcell access station location by the RCC of the macrocell. This remoting action is achieved, via a remote time division multiplex (TDM) interface circuit pack which enables the RCC to communicate with the RCUs located at the microcell access station as if they were located within the macrocell BS.

DETAILED DESCRIPTION

Figure 1:
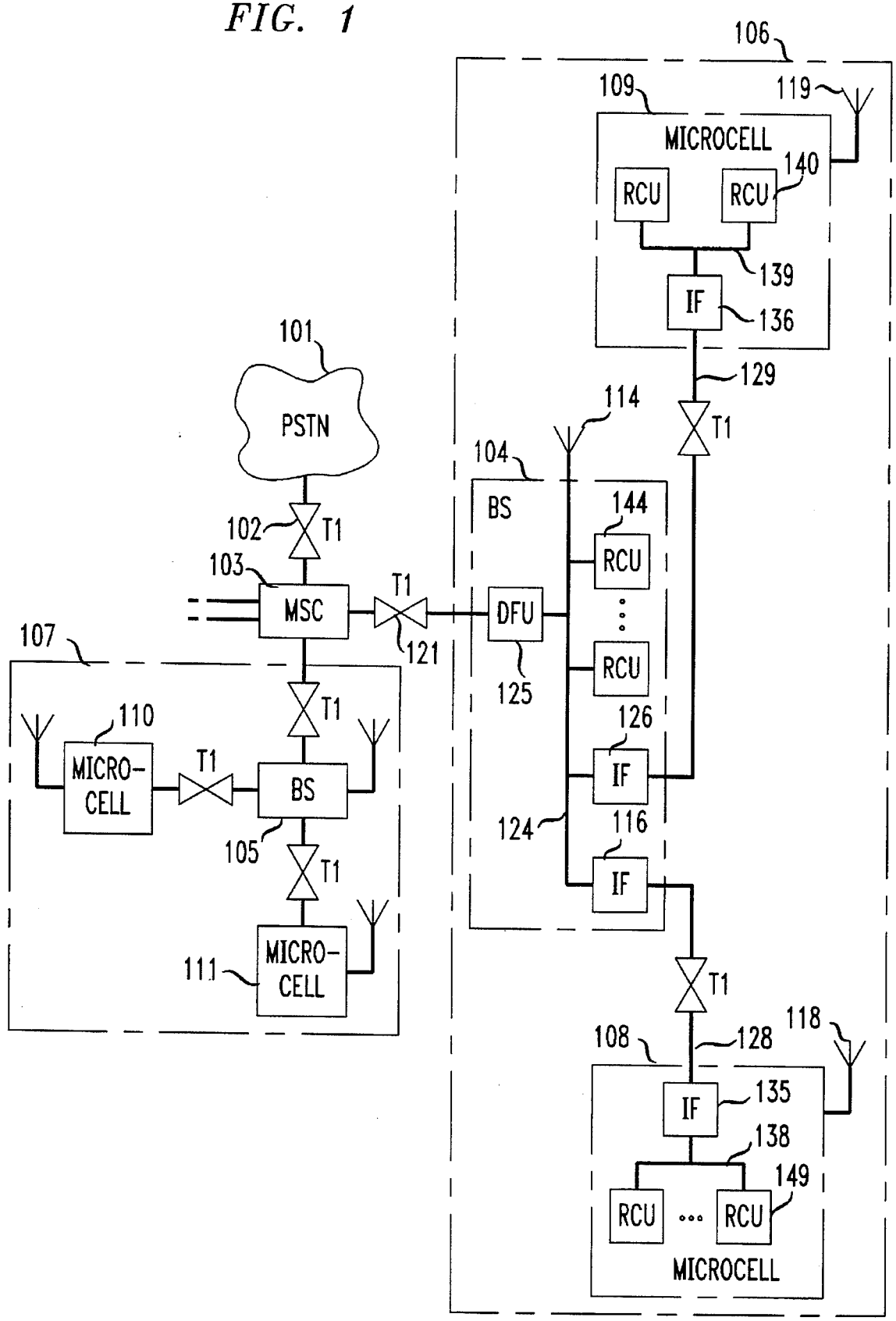
FIG. 1 is a block schematic of a cellular radio telephone system employing microcell access stations embodying the principles of the invention.

In the cellular radiotelephone system of FIG. 1 the public switched telephone network (PSTN) 101 is connected by a T1 carrier twisted wire pair link 102 to a mobile switching center (MSC) 103. The MSC 103 interconnects the PSTN 101 to a plurality of digital macrocell base stations (BS) 104 and 105, each operating as a macrocell site serving a particular geographical service area 106–107. Since a centralized BS may not provide adequate overall area coverage of its assigned area, microcell access stations 108–111, each under control of one of the BSs are located within the assigned service area to provide service in sub areas not adequately serviced by the controlling BS. This deficiency in service is often the result of failure of the centralized BS to satisfactorily radiate that sub area. The service area 106 is shown as containing one BS 104 and two microcell access stations 108 and 109.

Within the service area 106 the macrocell BS 104 has a radiating antenna 114. The two microcell access stations 108 and 109 also have radiating antennas 118 and 119 to provide radiant signal energy to sub areas not properly radiated by the macrocell BS 104. The microcell access stations 108 and 109 are each connected to the macrocell BS 104 by metallic twisted pair wires 128 and 129, respectively. These wires are typically operated as a T1 carder link.

The macrocell BS 104 is a digital BS which includes a digital time division multiplex bus 124 connecting a plurality of radio channel units 144 to a digital facilities control 125 connected to the MSC by a T1 carrier line 121. The TDM bus 124 is also connected to interface circuit 126, and 116, which are connected, via T1 carder links 135 and 136, to the interface circuits 128 and 129 located in the microcell access stations 108 and 109, respectively. The interconnected interface circuits 136 and 135 electrically interconnect the local TDM bus 124 of the macrocell BS 104 to the remote TDM busses 138 and 139 included in the microcell access stations 108 and 109, respectively. The electrical interconnection through the interface circuits 136 and 135 integrates the remote TDM busses 138 and 139 as an integral part of the local TDM bus 124.

Radio channel units (RCUs) 148 and 149 in each of the microcell access stations 108 and 109 are connected to the remote TDM busses 138 and 139. Due to the interface circuit interconnection and the metallic connection these RCUs 148 and 149 are effectively controlled, by the BS 104 in the same manner as are the RCUs 144 physically co-located with the local TDM bus within the macrocell BS 104. Hence the remote TDM busses 138 and 139 are effectively operative as a part of a single common bus 124 which controls the RCUs distributed among the macrocell BSs and the microcell access stations.

Figure 2:
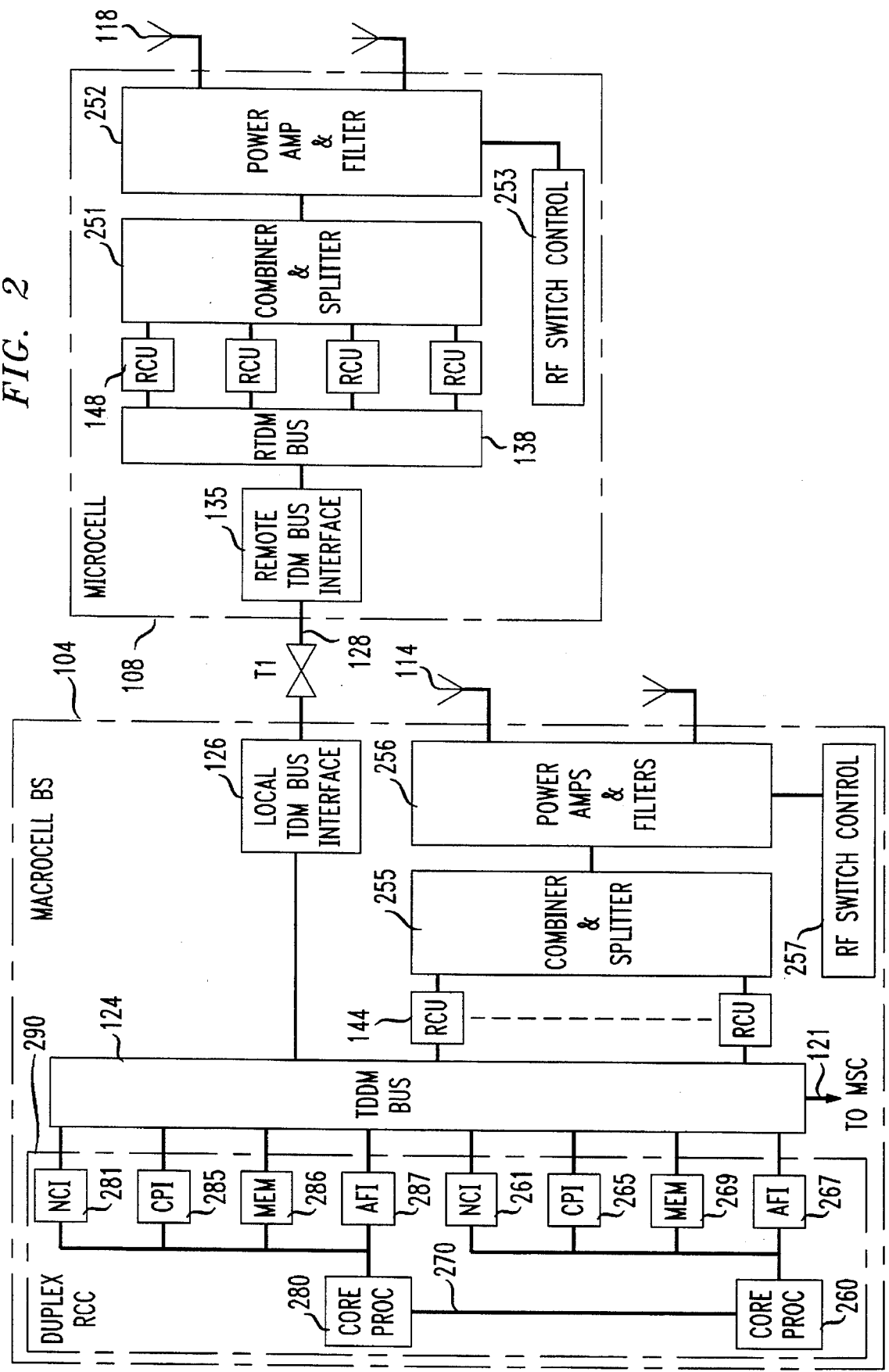
FIG. 2 is a block schematic of a macrocell BS and a microcell access station and their corresponding bus interconnection arrangement.

The multiplex bus 124 is, as shown in FIG. 2, a time division multiplex (TDM) bus in the illustrative embodiment. This TDM bus 124 is under the control of a radio control complex (RCC) 290 and is operative, under the control of the core computer processors 260 and 280 to connect circuitry, included within the RCC 290, to the RCUs 144 and through the local TDM interface circuit 126 to the RCUs 148 located at the microcell access station 108. The circuitry of the RCC includes an active control system and a parallel connected backup control system. The active control system includes a network control interface (NCI) 261 to synchronize control channel messages between the bus 124 and processor 260. A communications processor interface (CPI) 265 provides control channels for communicating with the MSC, via T1 carrier link 121, (shown in FIG. 1). A memory circuit (MEM) 269 is included to store call processing information. An alarm facility interface (AFI) 267 provides for alarm signaling. A backup core processor 280 is connected to the active processor 260 by an update data communication bus 270. It's stored memory is continuously updated by the processor 260, via the update bus 270. The NCI 281, CPI 285, MEM 289, and AFI 287 connected to processor 280, all function in the same manner as their duplexed counterparts connected to processor 260. Their function is to assume bus and system control should processor 260 fail.

The macrocell BS 104 includes a plurality of RCUs 144 connected to the TDM bus 124. These RCUs are transceiver circuits connected to a combiner/splitter circuit 255 which splits outgoing signals into parallel paths connected to a plurality of paralleled linear amplifiers and filters 256. The plurality of linear amplifiers are operated in parallel to reduce the signal power level that any single amplifier must accommodate. The combiner/splitter 255 receives incoming signals from paralleled amplifiers and combines them and applies them to the RCUs 144. The amplifiers 256 are connected to the antennas 114. An RF switch control 257 is used to control connection of the amplifiers to selected antennas 114 of the macrocell BS 104.

A local TDM interface circuit 126 is connected to the TDM bus 124 and is connected, via the T1 carrier metallic wire, to a corresponding remote TDM interface circuit 135 located at the microcell station 108. This remote TDM interface 135 is connected to the remote TDM bus 138 (TDM). The local and remote TDM interfaces 126 and 135 are operative to condition signals for their transmission over the T1 carrier wire 128 and incorporate the remote TDM bus 138 as an integral part of the local TDM bus 124 at the BS 104.

Connected to the remote TDM bus 138 are a plurality of RCUs 148 which are also connected to a combiner/splitter 251. The combiner/splitter 251 is connected to a power amplifier array 252 which is in turn connected to antennas 118. Coupling of RCUs 148 and antennas 118 is under control of a RF switch control 253.

The microcell's RCUs 148 provide for two way voice connection to the mobile radiotelephone subscribers in a sub area radiated by the microcell access station. They modulate and control voice and control information transmitted over the air interface. The combiner/splitter 251 applies a combined signal of a plurality of channels to the amplifier 252 which amplifiers the signal to a level appropriate for providing service to the area covered by the microcell.

Figure 3:
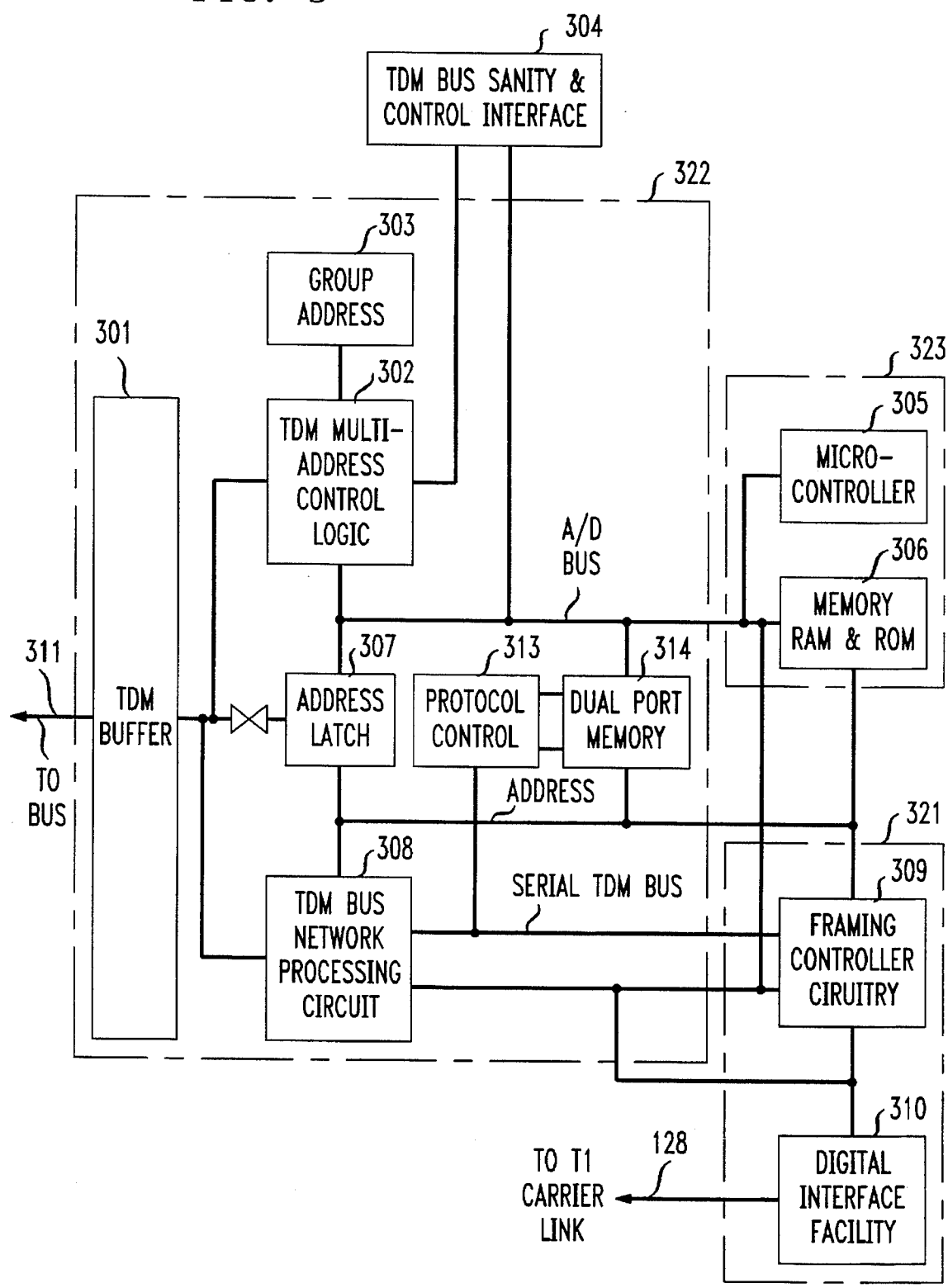
FIG. 3 is a block schematic of an interface circuit used to couple a bus of the macrocell BS with a bus in the microcell access station.

The structure of both the local and remote TDM bus interfaces 126 and 135 are shown in detail in the block diagram of FIG. 3. The local and remote bus interfaces communicate with each other over a T1 carrier link 128 interconnecting the macrocell BS and the microcell access station. Interfacing to the T1 carrier link is provided by a T1 link interface 321, which includes the Digital interface facility 310 and the framing controller circuitry 309. The T1 carrier link 128 is connected to a DS1 digital interface facility 310. The T1 link interface 321 provides framing, signaling and data link access to the T1 carrier link. The typical DS1 format is 24 digital voice communication channels in slots of 64K bits/sec serial data packaged in the proper framing format for transmission over a T1 link at 1.544 Mbit/sec. The digital interface facility includes circuitry to permit interfaces with CEPT lines (a European Standard).

Control of the bus interface circuitry is directed by a board control unit 323 including a microcontroller 305 and an associated memory unit 306. The memory unit includes RAM and ROM memory to store data and provide stored program instructions for controlling operation of the interface unit.

Within the bus interface 321 the DS1 digital interface facility 310 is connected to a framing and controller circuit 309. This circuit packages the digital signal frame for transmission over the T1 carrier link and provides the proper framing format.

The TDM bus interface 322 plugs into a normal RCU TDM bus slot with lead 311. The bus interace 322 includes a TDM buffer circuit 301 which is connected to a TDM bus slot of either the BS or microcell access station depending on the location of the TDM bus interface at either the BS or microcell access station. The TDM buffer is connected to the TDM multi-address control logic circuit 302. A manually switched group address control is connected to an input of the control logic circuit 302 to provide manual addressing control. A dual port memory 314 is connected to a bus coupling the controller 323 to the protocol controller 313. The protocol controller 313, connected to the dual port memory operates to provide data retransmission to the T1 link interface 321 and provide formatting functions such as CRC checking and framing.

A network processing circuit 308 provides information transfer, including a serial to parallel conversion, between the T1 link interface 321 and the TDM buffer 301.

Overall TDM interface circuit protection is provided by a TDM bus sanity and control interface circuit 304.

We claim:

1. In a cellular radiotelephone system having a macrocell base station (BS) and a microcell access station responsive to the macrocell BS and providing enhanced service to a sub service area of the service area of the macrocell BS; the system comprising:

a digital time division multiplex (TDM) bus having a plurality of time slots shared by both the macrocell BS and the microcell access station in which time slots of the microcell access station are an integral pan of the TDM bus of the macrocell base station;

a metallic wire for interconnecting the macrocell BS to the microcell access station;

the macrocell BS comprising:

a plurality of BS radio channel units (RCUs);

at least a first subplurality of the plurality of time slots of the digital time division multiplex (TDM) bus included in the macrocell BS for connecting the BS RCUs to a mobile switching center (MSC);

a radio control complex (RCC) located at the BS and connected to and controlling the BS TDM bus;

a local TDM bus interface connected to a portion of the BS (TDM) bus included in the macrocell BS and connected to the metallic wire;

the microcell access station comprising:

a second subplurality of the plurality of time slots of the digital time division multiplex (TDM) bus being located at the microcell access station;

a plurality of microcell radio channel units (RCUs) connected to the time slots of the digital time division multiplex (TDM) bus located at the microcell access station;

a remote TDM bus interface connected to a portion of the TDM bus located at the microcell access system;

the local TDM bus interface and the remote TDM bus interface each including:

a link interface with a digital interface for connecting to the metallic wire;

a TDM buffer, the TDM buffer of the local TDM bus interface connected to a TDM bus slot of the BS TDM bus included in the macrocell BS and the TDM buffer of the remote TDM bus interface connected to a TDM bus slot of the TDM bus located at the microcell access station;

a TDM multi-address control logic circuit connected to the TDM buffer for providing TDM address control;

whereby the local and remote TDM bus interfaces are connected together through the metallic wire to incorporate the second plurality of time slots of the digital time division multiplex (TDM) bus as an integral portion of the TDM bus at the macrocell BS.

2. In a cellular radiotelephone system as claimed in claim 1:

wherein:

the metallic wire is a twisted pair operating as a T1 carrier link.

3. In a cellular radiotelephone system as claimed in claim 2:

wherein:

the local and remote TDM bus interfaces further include:

network processing apparatus for providing information transfer and serial to parallel conversion between the T1 carrier link and the TDM buffer.

4. In a cellular radio system as claimed in claim 1:

the RCC is connected by the metallic wire to provide control for RCUs at the microcell access station.

5. In a cellular radiotelephone system as claimed in claim 2:

wherein:

the local and TDM bus interfaces include message processing circuitry for formatting messages and for providing interfacing compatibility.

* * * * *